United States Patent [19]
Fleming et al.

[11] Patent Number: 5,185,402
[45] Date of Patent: Feb. 9, 1993

[54] FLOCK ADHESIVE

[75] Inventors: Kenneth E. Fleming, Edinboro; Jeffrey A. Chapman, Erie, both of Pa.

[73] Assignee: Lord Corporation, Erie, Pa.

[21] Appl. No.: 618,120

[22] Filed: Nov. 26, 1990

[51] Int. Cl.$^5$ .................... C08L 23/28; C08L 75/08; C08G 18/67; C08G 18/28
[52] U.S. Cl. ..................... 525/130; 525/129; 528/59; 528/75; 528/76; 528/905
[58] Field of Search ............... 428/90; 525/129, 130; 528/59, 75, 76, 905

[56] References Cited

U.S. PATENT DOCUMENTS

| | | | |
|---|---|---|---|
| 3,349,049 | 10/1967 | Seiwert et al. | 524/906 |
| 3,882,191 | 5/1975 | Balatoni et al. | 260/859 PV |
| 4,053,440 | 10/1977 | Bonnet et al. | 260/4 R |
| 4,535,121 | 8/1985 | Ozelli et al. | 524/715 |
| 4,835,226 | 5/1989 | Warren et al. | 525/504 |
| 4,892,756 | 1/1990 | Warren et al. | 528/61 |
| 4,914,149 | 4/1990 | Fleming et al. | 524/507 |
| 5,064,928 | 11/1991 | Kase et al. | 528/85 |

FOREIGN PATENT DOCUMENTS

| | | | |
|---|---|---|---|
| 0369607 | 5/1990 | European Pat. Off. | 525/458 |
| 2164778 | 7/1987 | Japan | 525/129 |

OTHER PUBLICATIONS

Saunders & Frisch "Polyurethanes Chemistry and Technology Part II." Interscience Publishers (1964). pp. 355-358.

*Primary Examiner*—James J. Seidleck
*Assistant Examiner*—Thomas Hamilton, III
*Attorney, Agent, or Firm*—W. Graham Buie

[57] ABSTRACT

An adhesive composition which contains two distinct polyurethane prepolymers and a halogenated polyolefin and which is useful for bonding flock fibers to a thermoplastic or an elastomeric substrate. The first polyurethane prepolymer is derived from poly(alkylene oxide) polyols while the second polyurethane prepolymer is derived from poly(alkylene oxide) polyols and a dimer acid polyol. Both of the polyurethane prepolymers are preferably derived from a mixture of poly(alkylene oxide) polyols having different molecular weights.

28 Claims, No Drawings

FLOCK ADHESIVE

FIELD OF THE INVENTION

This invention relates to the bonding of substrates with the use of appropriate adhesive compositions. More specifically, the present invention relates to high-strength and abrasion-resistant flock adhesive compositions which are based on polyurethane prepolymers and a halogenated polyolefin.

BACKGROUND OF THE INVENTION

The preparation of flocked articles, wherein flocks are affixed to the surface of a thermoplastic or elastomeric material through an adhesive layer such as a polyurethane, is well known. In such processes, the elastomeric surface is coated with a layer of the adhesive and short staple fibers are applied perpendicularly thereto, often utilizing an electrical field. The resulting electrostatically flocked articles are characterized by a fabriclike surface of relatively low friction. This feature renders flocked articles particularly suitable for the purpose of reducing friction between the sliding glass window and window channel of automobiles, or for enhancing the appearance, utility, and appeal of various pockets and glove boxes found in automotive interiors. In view of the abrasion and stress involved in these applications, it is imperative that the adhesive used to bond the flock to the thermoplastic or elastomeric material contain components which not only bond to the flock, but also bond to the thermoplastic or elastomeric substrate.

One example of a flock adhesive is disclosed in U.S. Pat. No. 4,835,226 and contains an aromatic nitroso compound, an epoxy resin, and an isocyanate functional urethane prepolymer wherein the prepolymer is blocked with a substituted or unsubstituted phenol. Dinitrosobenzene is disclosed as a typical aromatic nitroso compound while epoxy novolak resins are disclosed as typical epoxy resins. Agents for blocking the urethane prepolymer include phenols, and alkyl-substituted phenols such as nonylphenol and cresol.

U.S. Pat. No. 4,535,121 also discloses a flocking adhesive for flexible substrates that contains an isocyanate-terminated polyurethane prepolymer, the reaction product of an aromatic diisocyanate and a polyfunctional epoxide, a solvent, and a dispersant. Typical diisocyanate-epoxide reaction products include reaction products of triglycidyl isocyanurate, triglycidyl urazole, diglycidyl benzimidazolone, diglycidyl hydantoin, and condensed glycidyl hydantoins with diphenylmethane diisocyanate, toluene diisocyanate, paraphenylene diisocyanate, and xylene diisocyanate.

While previously developed flock adhesives such as those described above can theoretically be used as a one component preparation, it has been found in practice that in order to obtain maximum bond strength and abrasion resistance from these adhesives, it is necessary to utilize an adhesive primer for the thermoplastic or elastomeric surface. The requirement of a primer to obtain sufficient bond strength and abrasion resistance causes traditional flock adhesive compositions to be undesirable for many industrial applications since it is more efficient and time-saving to utilize a one-component adhesive in order to bond short staple fibers to a substrate.

A need therefore exists for a flock adhesive which can be effectively applied as a one-component composition to rubber or other elastomeric substrates onto which short staple fibers are to be affixed. The one-component composition should also provide high strength adhesive bonds which exhibit substantial abrasion resistance.

SUMMARY OF THE INVENTION

The present invention is a one-component flock adhesive composition that can be effectively applied to elastomeric substrates, especially thermoplastic substrates, in order to bond short staple fibers thereto. The present invention is based on a combination of two distinct polyurethane prepolymers and a film-forming component. Specifically, the present invention utilizes a first polyurethane prepolymer derived from poly(alkylene oxide) polyols and a second polyurethane prepolymer derived from poly(alkylene oxide) polyols and at least one dimer acid polyol. The invention further utilizes a film-forming component such as a halogenated polyolefin. It has presently been discovered that this combination of polyurethane prepolymers, when utilized with a film-forming component, results in one-component flock adhesive that exhibits excellent bond strength and substantial abrasion resistance.

DETAILED DESCRIPTION OF THE INVENTION

The flock adhesive of the present invention is based on the combination of distinct polyurethane prepolymers prepared from certain polyhydroxy compounds with a film-forming component such as a halogenated polyolefin. The first polyurethane prepolymer is prepared by reacting at least one poly(alkylene oxide) polyol, a hydroxy compound, and an isocyanate compound in the presence of one or more appropriate solvents.

The at least one poly(alkylene oxide) polyol used to prepare the first polyurethane prepolymer can be essentially any poly(alkylene oxide) polyol known in the art having at least two hydroxyl groups. The polyols are normally obtained from the polymerization, including block copolymerization, of cyclic ethers such as alkylene oxides, dioxolane and tetrahydrofuran, the condensation of glycols, or the condensation of cyclic ethers with glycols. They are well-known articles of commerce, and are also called polyalkylene ether glycols, polyalkylene glycols, polyalkylene oxide glycols, polyglycols and polyoxyalkylene glycols. They may be represented by the formula $HO(RO)_nH$, in which R is an alkylene radical and n is at least 2. The alkylene radical can be a single chain or can consist of two or more alkylene chains separated from each other by an ether oxygen atom. Preferred poly(alkylene oxide) polyols have from 1 to 9, preferably 1 to 6, carbon atoms in the alkylene chain separating each pair of oxygen atoms and have a number average molecular weight in the range of from about 100 to about 4,000, preferably about 100 to about 2,500. Not all the alkylene units need be the same. Poly(alkylene oxide) polyols formed by the copolymerization or condensation of mixtures of different cyclic ethers, glycols, or glycols and cyclic ethers can be used; as can poly(alkylene oxide) polyols derived from cyclic ethers such as dioxolane, which affords a polyol having the formula $HO(CH_2OCH_2CH_2O)_nH$, where n is greater than 1. The alkylene unit can be a straight or a branched chain, as in poly(propylene oxide) polyol. In the case where the alkylene unit is ethylene, it can be advantageous to incorporate the unit into a copolymer, for example, as a copolymer of ethylene oxide and propylene oxide, with up to 80 percent of such copolymer comprising ethylene oxide.

Representative poly(alkylene oxide) polyols for use in the present invention include poly(ethylene oxide) polyols, poly(propylene oxide) polyols, poly(tetramethylene oxide) polyols, poly(nonamethylene oxide) polyols, poly(oxymethylene-ethylene oxide) polyols, poly(ethylene oxide-propylene oxide copolymer) polyols, and poly(pentaerythritol-ethylene oxide) polyols. Thus, the poly(alkylene oxide) polyols will generally have from 2 to 6 hydroxyl groups, with such polyols having 2 hydroxyl groups being currently preferred. Preferred poly(alkylene oxide) polyols are poly(propylene oxide) polyols, poly(tetra-methylene oxide) polyols, poly(ethylene oxide-propylene oxide) polyols, and poly(ethylene oxide) polyols, with poly(propylene oxide) polyols, especially poly(propylene oxide) diol, being preferred.

It is particularly preferred to utilize more than one poly(alkylene oxide) polyol in the present invention such as a combination of polyols which differ in molecular weight. Specifically, the combination of a poly(alkylene oxide) polyol having a molecular weight in the range of from about 600 to 1,400, preferably about 800 to 1,200, with a second poly(alkylene oxide) polyol having a molecular weight in the range of from about 1,600 to 2,400, preferably about 1,800 to 2,200, has been shown to be particularly useful in the present invention. When using a combination of polyols having different molecular weights, it is preferred to use poly(propylene oxide) polyols, especially poly(propylene oxide) diols, having different molecular weights. The first poly(alkylene oxide) polyol of such a molecular weight combination is typically utilized in an amount from about 5 to about 20, preferably from about 10 to about 14, percent by weight of the total polyols utilized to prepare the first polyurethane prepolymer (hereinafter "total polyols"). The second poly(alkylene oxide) polyol of such a molecular weight combination is typically utilized in an amount from about 60 to about 90, preferably from about 70 to about 85, percent by weight of the total polyols. If only one poly(alkylene oxide) polyol is utilized in lieu of a combination of such polyols, the single poly(alkylene oxide) polyol is employed in an amount ranging from about 5 to 95, preferably from about 80 to 90, percent by weight of the total polyols.

The preparation of the first polyurethane prepolymer of the invention also involves the use of a hydroxy compound, preferably a trifunctional hydroxy compound so as to provide a branched or T-shaped structure to at least some segments of the polyurethane prepolymer. If desired, substantially any of the known monomeric alcohols having at least two hydroxyl groups, and polymeric non-poly(alkylene oxide) polyols having at least two hydroxyl groups, can be employed as the hydroxy compound in combination with the poly(alkylene oxide) polyols to form the first polyurethane prepolymer of the invention.

Representative monomeric and polymeric polyols and polyesters which can be utilized as the present hydroxy compound include trimethylolpropane; 1,2,6-hexane triol; glycerol; 1,4-butane diol; 1,3-butylene glycol; 1,6-hexane diol; cyclohexane diol; 4,4'-methylenebis(cyclohexanol); erythritol; pentaerythritol; neopentyl glycol; polycaprolactone diols and triols; poly(butadiene) diols; hydroxylated poly(butadiene) dienes; poly(tetramethylene adipate) diol; poly(ethylene succinate) diol; poly(1,3-butylene sebacate) diol; and (1,3-butylene glycol/glycerine/adipic acid/isophthalic acid) diol and triols. Mixtures of such monomeric and polymeric compounds can also be employed. Trifunctional hydroxy compounds such as trimethylolpropane, 1,2,6-hexane triol and glycerol are presently preferred. The hydroxy compound (also considered a polyol for purposes of the total polyols utilized to prepare the first polyurethane prepolymer) is utilized in an amount from about 4 to about 10, preferably from about 6 to about 8 percent by weight of the total polyols.

The single poly(alkylene oxide) polyol or combination of poly(alkylene oxide) polyols and the hydroxy compound (i.e., the total polyols) are typically utilized in an amount ranging from about 40 to 80, preferably from about 50 to 65, percent by weight of the total dry (excluding solvent) solid weight of the prepolymer composition.

The isocyanate compound utilized in the preparation of the first polyurethane prepolymer of the present invention can essentially be any polyisocyanate having at least two reactive isocyanate groups. Typical isocyanate compounds include, without limitation, polyisocyanates such as 4,4'-diphenylmethane diisocyanate; 4,4'-biphenyl diisocyanate; cyclohexylene-1,4-diisocyanate; 1,6-hexamethylene diisocyanate; 1,8-octamethylene diisocyanate; 1,12-dodecamethylene diisocyanate; 2,2,4-trimethylhexamethylene diisocyanate; and the like; 3,3'diisocyanatodipropyl ether; 3-isocyanatomethyl-3,5,5'-trimethylcyclohexyl isocyanate; cyclopentalene-1,3-diisocyanate; methyl 2,6-diisocycanatocaprolate; bis-(2-isocyanatoethyl)-fumarate; 4-methyl-1,3-diisocyanatocyclohexane; transvinylene diisocyanate and similar unsaturated polyisocyanates; 4,4'-methylene-bis-(cyclohexylisocyanate) and related polyisocyanates; methane diisocyanates; bis-(2-isocyanatoethyl)-carbonate and similar carbonate polyisocyanates; N,N'N"-tris-(6-isocyanatohexamethylene)biuret and related polyisocyanates; as well as other known polyisocyanates derived from aliphatic polyamines; aromatic polyisocyanates such as toluene diisocyanates; xylene diisocyanates; dianisidine diisocyanate; 1-ethoxy-2,4-diisocyanato-benzene; 1-chloro-2,4-diisocyanatobenzene; tris(4-isocyanatophenyl) methane; naphthalene diisocyanates; phenylene diisocyanates; 3,3'-dimethyl-4,4'-biphenyl diisocyanate; p-isocyanatobenzoyl isocyanates; tetrachloro-1,3-phenylene diisocyanate; and the like. At the present time, 4,4'-diphenylmethane diisocyanate is the preferred isocyanate compound for use in the present invention. The isocyanate compound is typically utilized in an amount ranging from about 20 to 60, preferably from about 35 to 45, percent by weight of the total dry solid weight of the prepolymer composition.

The first polyurethane prepolymer of the invention is typically prepared by combining the poly(alkylene oxide) polyols and the hydroxy compound together in the presence of a solvent at a temperature between about 100° C. and 200° C. The mixture is then typically cooled to between about 50° C. and 70° C. after which the isocyanate compound and any additional solvent are added. The resulting mixture is heated to between about 80° C. and 110° C. for about 3 to 6 hours to form a high viscosity prepolymer. When selecting the amounts of isocyanate and polyhydroxy compounds to be used, it is preferable to create in the mixture a NCO:OH functionality ratio of between about 1.05:1 and 10.00:1, preferably between about 1.50:1 and 4.00:1. The reaction is preferably carried out in an inert atmosphere (e.g., nitrogen) in the presence of a dry, non-reactive organic solvent. Typical solvents include xylene, toluene, methylisobutyl-ketone, acetate ethers and mixtures of acetate ethers such as the mixture of 85% propylene glycol methyl ether acetate and 15% dipropylene glycol methyl ether acetate supplied by the Dow Chemical Company under the tradename DOWANOL® BC-300, and combinations of such solvents. The solvent or solvent combination is utilized in an amount sufficient to produce an overall solids content of the polyurethane prepolymer of between about 25 and 90 percent, preferably between about 45 and 75 percent. The particular solvent, or combination of solvents, is selected depending on the particular isocyanate and polyol compounds utilized to produce the polyurethane prepolymer. Such selection of solvents to appropriately dissolve polyurethane prepolymers is well known in the art.

The first polyurethane prepolymer thus prepared is utilized in an amount ranging from about 2 to 20, preferably about 8 to 14, percent by weight of the total dry solid weight of the adhesive composition. It is important to ensure that the prepolymer is maintained free of moisture during storage and prior to utilization of the prepolymer in the present adhesive composition.

The second polyurethane prepolymer utilized in the present invention is also prepared from at least one poly(alkylene oxide) polyol, a hydroxy compound and an isocyanate compound in the presence of one or more solvents as described above with respect to the first polyurethane prepolymer (including the preferred components and combinations set forth above). However, the second polyurethane prepolymer is distinguished from the first prepolymer in that a dimer acid polyol is also utilized in the preparation of the second polyurethane prepolymer.

The dimer acid polyols of the present invention can be prepared by, for example, a Diels-Alder reaction of two or more identical or different unsaturated fatty acids to form a dimer acid as is known in the art. Typical fatty acids include linoleic, oleic, 9c-dodecenoic, myristoleic, palmitoleic, petroselenic, petroselaidic, elaidic, ricinoleic, linolelaidic, linolenic, α-eleostearic, β-eleostearic, gadoleic, arachidonic, erucic, brassidic, clupanodonic, selacholeic, ximenic and lumequeic acid with linoleic acid and oleic acid being preferred for purposes of the present invention. Dimer acids and their preparation are discussed in the Kirk-Othmer Encyclopedia of Chemical Technology, Volume 7, pp. 768–770, (1979). The dimer acids thus prepared are then converted to dimer acid polyols by reducing the carboxyl groups to alcohol groups by techniques known in the art, such as lithium aluminum hydride reduction. A particularly preferred dimer acid polyol for use in the present invention is prepared from a Diels-Alder reaction of 2 moles of 9,12-linoleic acid followed by a reduction of the carboxyl groups to form a dimer acid polyol having the structure:

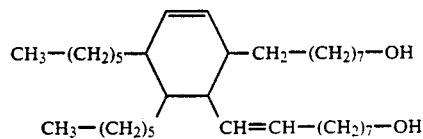

An example of a commercially available dimer acid polyol derived from 9,12-linoleic acid is supplied by Henkel Corporation under the tradename SOVERMOL 650 NS. The dimer acid polyol is utilized in an amount ranging from about 0.2 to about 10, preferably from about 1 to about 4 percent by weight of the total polyols utilized to prepare the second polyurethane prepolymer.

The poly(alkylene oxide) polyol, hydroxy compound and isocyanate compound of the second polyurethane prepolymer are of the same type and are used in the same amounts and combinations as disclosed above for the first polyurethane prepolymer. The second polyurethane prepolymer is prepared in the manner described above for the first polyurethane prepolymer except that the dimer acid polyol is combined with the poly(alkylene oxide) polyol and the hydroxy compound prior to the addition of the isocyanate compound. The second polyurethane prepolymer is utilized in an amount ranging from about 55 to 95, preferably about 65 to 80, percent by weight of the total dry solid weight of the adhesive composition.

The halogenated polyolefin of the present invention can essentially be any natural or synthetic halogenated polyolefin elastomer. Generally, the halogenated material has an inherent viscosity above 100 centipoise at 20 percent concentration in toluene and a halogen content of about 58 to 68 percent by weight. The halogens employed in the halogenated polyolefinic elastomer are typically chlorine or bromine, although fluorine can also be used. Mixtures of halogens can also be employed in which case the halogen-containing polyolefinic elastomer will have more than one type of halogen substituted thereon. Halogenated polyolefins and their preparation are well-known to those skilled in the art.

Representative halogenated polyolefins include halogenated polyethylenes such as chlorinated polyethylene and chlorosulfonated polyethylene; halogenated polypropylene; halogenated polybutylene; chlorinated natural rubber; chlorine- and bromine-containing synthetic rubbers including polychloroprene; chlorinated polychloroprene; halogenated polybutadienes such as chlorinated polybutadiene; halogenated polyisoprene; halogenated polyhexadiene; hexachloropentadiene; chlorinated butadiene styrene copolymers; chlorinated ethylene propylene copolymers and ethylene/propylene/-non-conjugated diene terpolymers; brominated poly(2,3-dichloro-1,3-butadiene); copolymers of α-chloroacrylonitrile and 2,3-dichloro-1,3-butadiene; halogenated homopolymers or copolymers of vinyl halide such as chlorinated poly(vinyl chloride); and the like, including mixtures of such halogen-containing elastomers. Thus substantially any of the known halogen-containing derivatives of natural and synthetic elastomers can be employed in the practice of this invention, including mixtures of such elastomers. At the present time, halogenated polyethylenes or polypropylenes, especially chlorinated polypropylene, constitute preferred halogenated polyolefins for use in the present invention. The halogenated polyolefin is normally utilized in an amount from about 2 to about 15, preferably from about 5 to about 10, percent by weight of the total dry solid weight of the adhesive composition.

The adhesive composition of the invention may also contain optional components such as conventional hardening agents including polyhydric alcohols or polyfunctional amines. In addition, the adhesive compositions can contain filler materials, such as carbon black and the like, pigments, viscosity improvers such as fumed silica, etc. Also, catalysts to facilitate curing can be incorporated and preferred catalysts include triethylenediamine, N,N,N',N'-tetrakis(2-hydroxypropyl)ethylene-diamine and mixtures thereof.

The adhesives of the present invention are typically prepared by combining any pigments and fillers with solvent and the halogenated polyolefin in a high speed disperser and grinding to achieve a smooth mixture, keeping temperatures less than about 140° F. Then, with the temperature less than about 100° F., the urethane prepolymers are then added slowly under agitation until all the urethane is contained in the mixture. Typical solvents useful for preparing the adhesive include xylene, toluene, and 1,1,1-trichloroethane, with xylene being preferred. The solvent is utilized in an amount sufficient to enable proper application by brushing, spraying, or the like. The solvent typically comprises from about 40 to 80, preferably from about 50 to 70, percent by weight of the final adhesive composition.

In the flocking of uncured elastomers, mixtures normally used in the vulcanization process such as, for example, fatty acids, oxides of magnesium, calcium or zinc, the vulcanization accelerators, stabilizers, solvents, fillers and the like may be shaped along with the uncured elastomer into the desired form and coated with the adhesive of the invention. The flock fibers may then be applied in an electrostatic field and the flocked elastomer vulcanized for about 2 to 6 minutes at temperatures in the range of about 300° F. to 500° F. during which the adhesive is hardened.

In the coating of cured elastomers, the flock adhesive of the invention is typically applied or coated onto the elastomeric substrate in a conventional manner such as by dipping, spraying, brushing, or the like. The fibers are normally applied to the coated substrate in an electrostatic field and the adhesive is subsequently hardened for about 1 to 4 minutes at temperatures in the range of about 300° F. to 500° F.

In flocking various thermoplastic elastomers, such as SANTOPRENE ® supplied by Monsanto, similar application methods for the adhesive and flock may be used, but the cure temperature must be significantly lower, about 200° F. to 250° F., to prevent deformation of the formed shape. Cure times of about 2 to 10 minutes are typically utilized.

Various elastomers can be flocked before or after vulcanization using the adhesives of the invention. Illustrative of elastomeric materials that can be flocked are thermoplastic elastomers, natural rubbers, polychloroprene rubber, nitrile rubber, chlorobutadiene, chlorinated isoprenes, butyl rubber, polyurethane rubber, elastomers based on styrene-butadiene or styrene-isoprene, elastomers based on ethylene/propylene copolymers (EPM) and terpolymers of ethylene, propylene and diene monomers (EPDM). In most instances, however, the present adhesives will be used to flock thermoplastic elastomers such as, for example, the SANTOPRENE thermoplastic elastomers supplied by Monsanto.

The fibers applied using the adhesives of the invention can be various synthetic fibers including polyester fibers such as polyethylene terephthalate, polyamide fibers such as Nylon-6 or Nylon-6,6, polyurethane fibers, cotton fibers and/or cellulose fibers. Staple fibers having an average length of about 0.2 mm to about 2 mm are preferred.

Although the adhesives of the present invention are preferred for bonding flock fibers to thermoplastic elastomers, the present adhesive compositions may be applied as an adhesive, primer or coating to any surface or substrate capable of receiving the adhesive. In most instances, the adhesives of the invention will be used to flock profiles of thermoplastic or rubber elastomers which are employed for the sealing of openings for sliding automotive windows. Other applications include the production of flocked mats, flocked flexible shafts, flocked floorcovering, flocked rubber gloves, and the like.

The following examples are provided for purposes of illustrating the invention, and are not intended to limit in any manner the scope of the invention.

Procedure

Preparation of First Polyurethane Prepolymer

To a stirred glass resin kettle are added 229.9 g of xylene, 264.7 g of toluene, 139.8 g of poly(propylene oxide) diol (MW 1025), 1064.6 g of poly(propylene oxide) diol (MW 2025), and 88.8 g of trimethylolpropane. The kettle is fitted with an external heating mantle, cold water condenser, Dean Stark trap and nitrogen purge. The mixture is heated to 151° C. and 105.3 g of the mixture are removed by azeotropic distillation.

During distillation, to a separate thinning kettle are added 770.3 g of methylisobutyl ketone, 243.1 g of xylene, 243.4 g of toluene, 21.4 g of di-t-butyl-p-cresol (an antioxidant) and 105.4 g of DOWANOL BC-300. The kettle is heated to 87.7° C. with constant agitation. To the kettle is then added 827.7 g of 4,4'-diphenylmethane diisocyanate preheated to 38° C.

When distillation is complete, the glass resin kettle and ingredients are cooled to 82° C.–87° C. and the ingredients are pumped into the thinning kettle. The thinning kettle is then heated to 90° C. and maintained at that temperature for 3.5 hours. The resulting prepolymer is cooled under $N_2$ purge to 37.7° C. to obtain a 6.8% NCO based on solution (96.5% of theoretical).

Preparation of Second Polyurethane Prepolymer

To a stirred glass resin kettle are added 294 g of poly(propylene oxide) diol (MW 1025), 1208.3 g of poly(propylene oxide) diol (MW 2025), 91.5 g of a dimer acid polyol derived from 9,12-linoleic acid (SOVERMOL 650 NS), 49.5 g of trimethylolpropane, and 1010.7 g of xylene. The kettle is fitted with an external heating mantle, cold water condenser, Dean Stark trap, and nitrogen purge. The mixture is heated to 151° C. and 101 g (10%) of the xylene is azeotroped (distilled) in order to remove any water. The mixture is cooled with a water bath to 60° C. and 981.8 g of 4,4'-diphenylmethane diisocyanate and 206.3 g of DOWANOL BC-300 are added to the mixture. The reactants are heated to 90°–95° C. After 4.5 hours, the reaction is stopped at 4.28% NCO, 100.9% of theoretical completion. The prepolymer is cooled and packaged under a nitrogen atmosphere.

Preparation of Adhesive

To a water-jacketed grind tank are added 93.8 g of pigments and fillers (49.5 g carbon black, 7.4 g fumed silica, 36.9 g $SiO_2$) (5.4% by dry weight), 258.3 g of chlorinated polypropylene (CP 343-1 supplied by Eastman Chemical) (7.5% by dry weight), and 849.1 g of xylene to produce a mixture having a solids content of 18% by weight. This mixture is ground in a Kady Mill at high speeds until a grind of 1.5 mil is reached while the temperature is kept below 140° F. After cooling the mixture to less than 100° F., 304.2 g of the first polyurethane prepolymer (9.5% by dry weight) prepared as above is added with constant agitation at low speed to stabilize this dispersion.

To a separate vessel under agitation are added 1350.3 g of the second polyurethane prepolymer (77.3% by dry weight) prepared as above and 551.4 g of xylene to produce a mixture having a solids content of about 50%. To this agitating mixture is added 1098.9 g of the above dispersion (22.6% by dry weight), and the resulting adhesive composition is thoroughly mixed.

All of the dispersing and blending of the prepolymers and the resulting adhesive is carried out under a nitrogen atmosphere.

Flocking Procedure

The flock adhesive prepared above is brush-coated onto three different ambient temperature substrates (described below in Table 1). The coated substrate is flocked using a manual flocking apparatus with polyester flock. (High voltage electrostatic flock chambers can also be used.) The flocked substrate is cured in an I.R. oven for about 5 minutes at 200° F. The resulting flocked parts are removed from the oven and allowed to post-cure for 3 days at ambient temperatures.

After the post-cure, the flocked panels are brushed to remove excess flock. Test strips 5 inches long by 0.5 inches wide are cut and subjected to the epoxy bond test and double rub test described below.

Epoxy Bond Test

This test is designed to test the adhesion of the adhesive to the elastomeric or thermoplastic substrate. The flocked test strips are bonded to degreased grit-blasted steel coupons using a two-part epoxy adhesive. The epoxy adhesive is applied to the coupons which are taped off to expose a one-inch square area. After application of the epoxy adhesive, the flocked test strip is pressed into the epoxy adhesive with the flocked side down. A blank coupon is then placed on the back of the test strip, and the whole assembly held in place with a binder clip. The assemblies are left to cure at ambient temperatures for approximately 24 hours. At this time, the clips are removed and the strips are then peeled from the coupon at a 45° peel angle and a speed of 2 inches per minute at ambient conditions. The peel strength in pounds per linear inch (PLI) and the percent substrate retention are recorded. Failure in the substrate indicates that the adhesive is stronger than the substrate itself and therefore a high percent of substrate retention is desirable. Four samples are used per test.

Double Rub Test

This test is designed to measure the adhesion of the adhesive to the flock. Test strips are prepared as in the flocking procedure and rubbed with a tongue depressor at an approximate 30° angle until the flock is worn away and the substrate is exposed. A double rub is one up and down motion. The number of double rubs to achieve this are recorded.

Wear Resistance—Taber Abrasion

This test is used to evaluate the wear resistance of the adhesive to the flock. A flocked disk, ~4" diameter prepared as in the flocking procedures, is placed on a Taber Abrasion turntable. An abrasive wheel (CS-10) with a 500 g load is lowered onto the flock disk and a 100 cycle test is run. Cycles and wear characteristics are recorded.

Data from the Epoxy Bond Test, Double Rubs, and Taber Abrasion are given below in Table 1.

TABLE 1

| | Test Strips | PLI | % Retention* | Double Rubs |
|---|---|---|---|---|
| I. | Commercial Thermoplastic (Stock No. 5667-59) | 58 | 99 | 49 |
| II. | Santoprene ® #121-67 | 17.5 | 98 | 55 |
| III. | Santoprene ® #201-55 | 17.0 | 95 | 55 |

*Examination of the mode of failure results in an estimate of the precent substrate retained, where the failure is within the substrate itself.

Taber Abrasion is conducted on (I) above and passes at 100 cycles with no flock removal.

The above procedures and data demonstrate that the adhesive composition of the present invention exhibits excellent adhesion to both substrate and flock when applied as a one-component composition.

What is claimed is:

1. An adhesive composition comprising a first polyurethane prepolymer, a second polyurethane prepolymer, and a halogenated polyolefin, wherein the first polyurethane prepolymer is derived from at least one poly(alkylene oxide) polyol, and the second polyurethane prepolymer is derived from at least one poly(alkylene oxide) polyol and a dimer acid polyol.

2. An adhesive composition according to claim 1 wherein the first polyurethane prepolymer is derived from at least one poly(alkylene oxide) polyol, a hydroxy compound, and an isocyanate compound, wherein the hydroxy compound is any of the known monomeric alcohols having at least two hydroxyl groups, or polymeric non-poly(alkylene oxide) polyols having at least two hydroxyl groups.

3. An adhesive composition according to claim 2 wherein the at least one poly(alkylene oxide) polyol is selected from the group consisting of poly(propylene oxide) polyols, poly(tetramethylene oxide) polyols, poly(ethylene oxide-propylene oxide) polyols, and poly(ethylene oxide) polyols.

4. An adhesive composition according to claim 3 wherein the at least one poly(alkylene oxide) polyol is a mixture of a first poly(alkylene oxide) polyol having a molecular weight in the range of from about 600 to 1,400 and a second poly(alkylene oxide) polyol having a molecular weight in the range of from about 1,600 to 2,400.

5. An adhesive composition according to claim 4 wherein the first poly(alkylene oxide) polyol and the second poly(alkylene oxide) polyol are both a poly(propylene oxide) diol.

6. An adhesive composition according to claim 2 wherein the hydroxy compound is selected from the group consisting of trimethylolpropane, 1,2,6-hexane triol, glycerol, 1,4-butane diol, 1,3-butylene glycol, 1,6-hexane diol, and cyclohexane diol.

7. An adhesive composition according to claim 6 wherein the hydroxy compound is selected from the group consisting of trimethylolpropane, 1,2,6-hexane triol, and glycerol.

8. An adhesive composition according to claim 2 wherein the isocyanate compound is selected from the group consisting of 4,4'-diphenylmethane diisocyanate, 4,4'-biphenyl diisocyanate, cyclohexylene-1,4-diisocyanate, and 1,6-hexamethylene diisocyanate.

9. An adhesive composition according to claim 8 wherein the isocyanate compound is 4,4'-diphenylmethane diisocyanate.

10. An adhesive composition according to claim 1 wherein the second polyurethane prepolymer is derived from at least one poly(alkylene oxide) polyol, a hydroxy compound, an isocyanate compound, and a dimer acid polyol, wherein the hydroxy compound is any of the known monomeric alcohols having at least two hydroxyl groups, or polymeric non-poly(alkylene oxide) polyols having at least two hydroxyl groups.

11. An adhesive composition according to claim 10 wherein the at least one poly(alkylene oxide) polyol is selected from the group consisting of poly(propylene oxide) polyols, poly(tetramethylene oxide) polyols, poly(ethylene oxide-propylene oxide) polyols, and poly(ethylene oxide) polyols.

12. An adhesive composition according to claim 11 wherein the at least one poly(alkylene oxide) polyol is a mixture of a first poly(alkylene oxide) polyol having a molecular weight in the range of from about 600 to 1,400 and a second poly(alkylene oxide) polyol having a molecular weight in the range of from about 1,600 to 2,400.

13. An adhesive composition according to claim 12 wherein the first poly(alkylene oxide) polyol and the second poly(alkylene oxide) polyol are both a poly(propylene oxide) diol.

14. An adhesive composition according to claim 10 wherein the hydroxy compound is selected from the group consisting of trimethylolpropane, 1,2,6-hexane triol, glycerol, 1,4-butane diol, 1,3-butylene glycol, 1,6-hexane diol, and cyclohexane diol.

15. An adhesive composition according to claim 14 wherein the hydroxy compound is selected from the group consisting of trimethylolpropane, 1,2,6-hexane triol, and glycerol.

16. An adhesive composition according to claim 10 wherein the isocyanate compound is selected from the group consisting of 4,4'-diphenylmethane diisocyanate, 4,4'-biphenyl diisocyanate, cyclohexylene-1,4-diisocyanate, and 1,6-hexamethylene diisocyanate.

17. An adhesive composition according to claim 16 wherein the isocyanate compound is 4,4'-diphenylmethane diisocyanate.

18. An adhesive composition according to claim 10 wherein the dimer acid polyol is prepared by a Diels-Alder reaction of at least two identical or different unsaturated fatty acids followed by a reduction reaction of the resulting Diels-Alder reaction product.

19. An adhesive composition according to claim 18 wherein the unsaturated fatty acids are selected from the group consisting of linoleic, oleic, 9c-dodecenoic, myristoleic, palmitoleic, petroselenic, petroselaidic, elaidic, ricinoleic, linolelaidic, linolenic, α-eleostearic, β-eleostearic, gadoleic, arachidonic, erucic, brassidic, clupanodonic, selacholeic, ximenic and lumequeic acid.

20. An adhesive composition according to claim 19 wherein the unsaturated fatty acids are linoleic acid or oleic acid.

21. An adhesive composition according to claim 18 wherein the dimer acid polyol is prepared from a Diels-Alder reaction of 2 moles of 9,12-linoleic acid followed by a reduction reaction of the resulting Diels-Alder reaction product to form a dimer acid polyol having the structure:

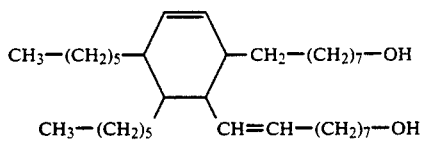

22. An adhesive composition according to claim 1 wherein the halogenated polyolefin is selected from the group consisting of halogenated polyethylenes and halogenated polypropylenes.

23. An adhesive composition according to claim 22 wherein the halogenated polyolefin is chlorinated polypropylene.

24. An adhesive composition according to claim 1 wherein the first polyurethane prepolymer is present in an amount ranging from about 2 to 20 percent by weight, the second polyurethane prepolymer is present in an amount ranging from about 55 to 95 percent by weight, and the halogenated polyolefin is present in an amount ranging from about 2 to 15 percent by weight, said percents by weight being based on the total dry solid weight of the adhesive composition.

25. An adhesive composition according to claim 24 wherein the first polyurethane prepolymer is present in an amount ranging from about 8 to 14 percent by weight, the second polyurethane prepolymer is present in an amount ranging from about 65 to 80 percent by weight, and the halogenated polyolefin is present in an amount ranging from about 5 to 10 percent by weight.

26. A flock adhesive composition comprising a first polyurethane prepolymer, a second polyurethane prepolymer, and a halogenated polyolefin wherein the first polyurethane prepolymer is derived from a first poly(alkylene oxide) polyol, a second poly(alkylene oxide) polyol, a hydroxy compound, and an isocyanate compound, and wherein the second polyurethane prepolymer is derived from a first poly(alkylene oxide) polyol, a second poly(alkylene oxide) polyol, a hydroxy compound, an isocyanate compound, and a dimer acid polyol, wherein the hydroxy compound is any of the known monomeric alcohols having at least two hydroxyl groups, or polymeric non-poly(alkylene oxide) polyols having at least two hydroxyl groups.

27. An adhesive composition according to claim 26 wherein the first poly(alkylene oxide) polyol of both the first and second polyurethane prepolymers is a poly(propylene oxide) diol having a molecular weight of between about 800 and 1,200; the second poly(alkylene oxide) polyol of both the first and second polyurethane prepolymers is a poly(propylene oxide) diol having a molecular weight between about 1,800 and 2,200; the hydroxy compound of both the first and second polyurethane prepolymers is trimethylolpropane; the isocyanate compound of both the first and second polyurethane prepolymers is 4,4'-diphenylmethane diisocyanate; and the dimer acid polyol of the second polyurethane prepolymer is derived from two moles of 9,12-linoleic acid and corresponds to the following structure:

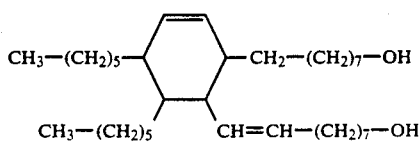

28. An adhesive composition according to claim 27 wherein the halogenated polyolefin is chlorinated polypropylene.

* * * * *